United States Patent [19]

Hasegawa

[11] Patent Number: 5,708,042
[45] Date of Patent: *Jan. 13, 1998

[54] METHOD OF MANUFACTURING ADHESIVE FOAMED PRODUCT

[76] Inventor: Itsuro Hasegawa, 4-3-9, Obata, Moriyama-ku, Nagoya-shi, Aichi-ken, Japan

[ * ] Notice: The term of this patent shall not extend beyond the expiration date of Pat. No. 5,631,304.

[21] Appl. No.: 548,612

[22] Filed: Oct. 26, 1995

[30] Foreign Application Priority Data

Oct. 27, 1994 [JP] Japan .................... 6-263911

[51] Int. Cl.$^6$ ......................... C08J 9/08
[52] U.S. Cl. ............... 521/94; 264/46.6; 264/46.7; 264/51; 264/54; 264/299; 521/96; 521/142; 521/149; 521/155
[58] Field of Search ............... 521/149, 142, 521/155, 94, 96; 264/46.6, 46.7, 51, 54, 299

[56] References Cited

U.S. PATENT DOCUMENTS

| | | | |
|---|---|---|---|
| 4,607,060 | 8/1986 | Kmiec et al. | 521/89 |
| 4,755,402 | 7/1988 | Oberle | 264/210.7 |
| 5,077,317 | 12/1991 | Yi-Shyu | 521/82 |
| 5,631,304 | 5/1997 | Hasegawa | 521/94 |

*Primary Examiner*—John M. Cooney, Jr.
*Attorney, Agent, or Firm*—Dennison, Meserole, Pollack & Scheiner

[57] ABSTRACT

A method of manufacturing an adhesive foamed product for use in a hollow component of a motorcar, includes the steps of mixing an adhesive resin, a foaming agent, a crosslinking agent, a foaming accelerator and a polymerizable monomer to thereby formulate a highly foamable composition, arranging the foamable composition thus formulated in the interior of a hollow component of a motorcar, and heating the foamable composition until it is foamed to have a shape corresponding substantially to the shape of the hollow component.

4 Claims, No Drawings

METHOD OF MANUFACTURING ADHESIVE FOAMED PRODUCT

BACKGROUND OF THE INVENTION

This invention relates to a method of manufacturing an adhesive foamed product having an expansion ratio of 10 or above and, more particularly, to a method of manufacturing an adhesive foamed product adapted to be filled in and adhered to the interior of a hollow component of a motorcar.

Heretofore, adhesive foamable parts have been used to fill up the interior of hollow components of a motorcar or the like for the purposes of muffling sound and preventing vibrations in vehicles. Specifically, a foamable part having a predetermined shape is disposed in an automotive hollow pillar and is foamed to fill the pillar and be bonded to and made integral with the inner surface thereof.

Such a foamable part has a merit that it permits muffling of sound or suppression of vibrations through on-site foaming thereof regardless of the shape of the hollow component, and this allows simplification of the process of manufacture as well as improvement of the sound muffling and vibration suppressing properties.

While such filling parts provide for the sound muffling and other properties, it is widely required for vehicles and the like to reduce the weight of such parts. The weight reduction demands foamable parts having as high foaming factors as possible. Prior art adhesive foamable parts, however, have an expansion ratio of about 8. Such a low expansion ratio imposes limitations on the weight reduction. In addition, it is insufficient from the standpoint of the material cost reduction.

The low expansion ratio has a further demerit that it frequently leads to the difficulty of obtaining three-dimensionally uniform foaming. Sometimes, it disables perfect filling of the interior of a hollow component to result in voids that are left due to heating irregularities or thickness differences of the component. Particularly, the resin that fills the major part of the interior is relatively increased, and it is difficult to fill very fine or narrow parts of the space as well with a foamed part.

A still further demerit of the low expansion ratio is that voids result from shrinkage of the foamed part in the interior of a hollow component.

With the part of low expansion ratio, therefore, it has been difficult to impart the sound muffling property or vibration suppressing property reliably because of the difficulty of control of the on-site foaming. In a different aspect, the foamable part is disposed in the interior of a hollow component in a spaced-apart relation thereto, and it is often difficult to mount and hold a foamable part which is relatively large compared to the volume of the interior of the hollow component. Further, there are cases when foaming makes the foamable part to be held insufficiently and come to contact with the inner surface of the hollow component, thus resulting in abnormal foaming and generation of voids.

SUMMARY OF THE INVENTION

It is, accordingly, an object of the invention to provide a method of manufacturing an adhesive foamed product which may be reliably filled in the interior of a hollow component of a motorcar.

It is another object of the invention to provide a method of manufacturing an adhesive foamed product which is sufficiently lightweight.

In order to solve the above problems, the inventor completed the following invention.

The present invention provides a method of manufacturing an adhesive foamed product for use in a hollow component of a motorcar, including the steps of mixing an adhesive resin, a foaming agent, a crosslinking agent, a foaming accelerator and a polymerizable monomer to thereby formulate a highly foamable composition, arranging the foamable composition thus formulated in the interior of a hollow component of a motorcar, and heating the foamable composition until it is foamed to have a shape corresponding substantially to the shape of the hollow component. The foamable composition held in the hollow component is foamed with a high expansion ratio so that it can fill even very narrow parts of the interior of the hollow component. In this way, sound muffling property and vibration suppressing property can be reliably imparted to the hollow component, while permitting weight reduction of the hollow component.

According to the invention, the formable composition is formed to have a volume in a range of $1/10$ to $1/30$ of the volume of the interior of the hollow component to be filled. Thus, it is possible to obtain cost reduction and weight reduction by reducing the size of the foamed product disposed in the hollow component. Reducing the size of the foamed product further permits readily and reliably holding the foamed product in the hollow component, so that it is possible to prevent abnormal foaming and reliably fill the hollow component. As a further merit, it is possible to improve the operation efficiency and the freedom of selecting the position of disposition of the foamed product in the hollow component.

The adhesive resin is selected from the group consisting of ethylene-methyl acrylate copolymer, ethylene-ethyl acrylate copolymer and a polymer blend of either of these copolymers and low-density polyethylene. In addition, the adhesive resin is selected from the group consisting of ethylene-butyl acrylate copolymer and a polymer of this copolymer and low-density polyethylene. Thus, it is possible to obtain satisfactory foaming and adhesion by using such adhesive resin. Besides, there is no problem of odor generation, and it is possible to provide a method which is suited for on-site foaming.

The polymerizable monomer is at least one member of the group consisting of triallyl cyanurate, triallyl isocyanurate and trimethylolpropane trimethacrylate, these members being an unsaturated tri-functional compounds, and is used in a total amount of 0.2 to 5.0 parts by weight with respect to 100 parts by weight of the adhesive resin. Such polymerizable monomer permits reduction of the non-uniformity of foaming and ensures stable foaming irrespective of the non-uniformity of heating of the foamable composition in the hollow component.

DETAILED DESCRIPTION OF THE PREFERRED EMBODIMENT

The invention will now be described in detail.

According to the invention, an adhesive foamed product is obtainable with an expansion ratio of 10 or above by heating a foamable composition which is prepared by adding a foaming agent, a crosslinking agent, a foaming accelerator and a polymerizable monomer to an adhesive resin. The invention is applicable to hollow components such as pillars and doors of vehicles such as a motorcar and, more broadly, parts requiring sound muffling and vibration suppressing.

The adhesive resin may typically be a mixture mainly containing a polymer of ethylene with an acrylic ester of an $C_1$–$C_5$ alcohol. Preferably, the mixture may have a content of such a polymer of not less than 50%. Examples of such a polymer include ethylene-methyl acrylate copolymer (hereinafter referred to as EMA), ethylene-ethyl acrylate copolymer (hereinafter referred to as EEA), ethylene-butyl acrylate copolymer (hereinafter referred to as EBA). The metal adhesive resin my be constituted substantially of only such a polymer, preferably EMA. Further, it is preferable that the polymer has a melt index of 0.2 to 2, preferably 0.2 to 1, and has an ester content of 12 to 18% by weight. The metal adhesive resin may be a mixture of EMA, EEA, EBA, or a blend thereof and low-density polyethylene (hereinafter referred to as LDPE). The mixture may have a LDPE content of not more than 50% so as not to lose adhesion of the metal adhesive resin.

The foaming agent according to the invention may be azodicarbonamide (hereinafter referred to as ADCA), oxibis (benzenesulfonyl hydrazid), dinitrobentamethylenetetramine, etc. either alone or in combination.

The crosslinking agent according to the invention may be dicumyl peroxide (hereinafter referred to as DCP), 1,3-bis (t-butylperoxyisopropyl) benzene, etc. either alone or in combination.

The foaming accelerator according to the invention may be zinc stearate, zinc oxide, magnesium oxide, stearic acid, etc.

The polymerizable monomer according to the invention may be triallyl cyanurate (hereinafter referred to as TAC), triallyl isocyanurate (hereinafter referred to as TAIC), trimethylolpropane trimethacrylate (hereinafter referred to as TMP), etc. either alone or in combination. Either of these compounds is an unsaturated tri-functional compound and permits uniform crosslinking and filling of even very narrow parts of the interior of a hollow component.

The amount of the polymerizable monomer is suitably 0.2 to 5.0 parts by weight with respect to 100 parts by weight of the adhesive resin, and is preferably 0.3 to 3.0 parts by weight in order to obtain sufficient surface activity.

The expansion ratio of the foamable composition may be set to 10 to 30, that is, the foamable composition may be formed to have 1/10 to 1/30 of the volume to be filled, order to permit material reduction and weight reduction and also permit reliable filling of the hollow component. In addition, the hollow component, and even very narrow parts of the interior of the hollow component, can be filled by foaming uniformly because of the small resin amount.

The reduced size foamable composition further can readily be held in the hollow component and ensure its holding as it is foamed, thus preventing abnormal foaming. The high expansion ratio can further increase the freedom of selecting the position of setting the foamable composition. To ensure isolation of the hollow component, the expansion ratio of the foamable composition is suitably 10 to 25.

The temperature conditions of the heating treatment subsequent to the mounting of the foamable composition in the hollow component, vary with the composition of the highly foamable composition and the expansion ratio to be obtained.

The heating treatment may be carried out in a specific process provided for foaming, but it may also be carried out at a time in a different heating process. In the latter case, the composition of the foamable composition is selected to obtain reliable filling under the temperature conditions of the different heating process.

The foamable composition should be formed under a stable condition free from the occurrence of foaming or solidification. To this end, a condition which can ensure sufficient fusing and mixing and also stability of the foamable composition, is set by taking the foaming temperature, composition of the foamable composition, etc. into consideration.

Examples of the invention will now be given.

Example 1

In this example, the following highly foamable composition was prepared to fusion form a product to be foamed in a hollow component of a motorcar.

| Composition of Highly Foamable Composition | |
| --- | --- |
|  | (in parts by weight) |
| Adhesive resin (EMA) | 100 |
| Foaming agent (ADCA) | 15 |
| Crosslinking agent (DCA) | 0.8 |
| Foaming accelerator (zinc oxide) | 0.3 |
| Polymerizable monomer (TAC) | 1.0 |
| (Liquid paraffin) | 1.0 |

The above components were dry blended in a mixer to obtain a highly foamable composition in a homogeneously blended state. The highly foamable composition thus prepared was fused and mixed in an extruder in a temperature range of 100° to 120° C. before being extruded as pellets which were then cut. The above temperature range was determined because excessive reduction of the viscosity of the composition makes it difficult to obtain uniform mixing and also for the purpose of preventing the incorporated crosslinking agent and foaming agent from being decomposed or rendered active.

From the pellets of the composition thus prepared, a substantially triangular foamable product corresponding in shape to the shape of the interior of the hollow component to be filled, was molded using an extrusion molder. The foamable product had approximately 1/14 of the volume of the hollow component. Again in the extrusion molder, the temperature and time of the process were controlled to suppress the crosslinking or foaming of the composition. The foamable product was then set in a hollow component in a spaced-apart relation thereto, and the product was then heated in an oven at 170° C. for 20 minutes. The product was then taken out of the oven and left to cool down.

A product having innumerable fine independent pores was thus formed to fill the interior of the hollow component, i.e., fill even very narrow parts of the interior, and be bonded to the hollow component. It was thus made integral with the hollow component to secure the isolating property thereof.

Example 2

In this example, the following highly foamable composition was prepared.

| Composition of Highly Foamable Composition | |
| --- | --- |
|  | (in parts by weight) |
| Adhesive resin (EMA) | 80 |
| (LDPE) | 40 |
| Foaming agent (ADCA) | 23 |
| Crosslinking agent (DCP) | 0.8 |
| Foaming accelerator (zinc stearate) | 0.2 |
| Polymerizable monomer (TMP) | 2.0 |
| (Liquid paraffin) | 1.0 |

The above components were dry blended using a mixer to obtain a homogeneous, highly foamable composition. In this example, the same EMA as in Example 1 was used. The above composition was fused and mixed using an extruder and in a temperature range of 100° to 120° C. to obtain a continuous sheet having a width of 300 mm and a thickness of 4 mm. The temperature range was determined from the same reason as in Example 1.

From this sheet, a foamable product having raised and recessed portions corresponding in shape to the shape of the interior of the hollow component to be filled was formed using a stamper. The foamable product thus obtained had about 1/25 of the volume of the interior of the hollow component. The foamable product was set in a hollow component in a spaced-apart relation thereto, and the product was heated in an oven at 100° C. for 30 minutes.

A product having innumerable fine independent pores was foamed to fill the interior of the hollow component, i.e., fill even very narrow portion of the interior, and be bonded to the hollow component. It was thus made integral with the hollow component to secure isolating property thereof.

The preferred embodiments herein described are intended to be illustrative of the invention and not to limit the invention to the precise form herein described. They are chosen and described to explain the principles of the invention and their application and practical use to enable others skilled in the art to practice the invention.

What is claimed is:

1. A method of manufacturing a motorcar component having a foam-filled interior comprising the steps of:

mixing together:
an adhesive resin selected from the group consisting of ethylene-methyl acrylate copolymer, ethylene-ethyl acrylate copolymer, ethylene-butyl acrylate copolymer and a polymer blend of ethylene-methyl acrylate copolymer, ethylene-ethyl acrylate copolymer or ethylene-butyl acrylate copolymer with low density polyethylene;

a foaming agent;

a crosslinking agent;

a foaming accelerator; and a polymerizable monomer selected from the group consisting of triallyl cyanurate, triallyl isocyanurate, trimethylolpropane trimethacrylate and mixtures thereof;

to thereby formulate a highly foamable composition;

arranging the foamable composition thus formulated in the interior of a hollow motorcar component; and heating the foamable composition arranged in the interior of the hollow component until it is foamed to have a shape corresponding substantially to the shape of the interior of the hollow component.

2. The method as defined in claim 1, wherein the foamable composition is formed to have a volume in a range of 1/10 to 1/30 of the volume of the interior of the hollow component to be filled.

3. The method as defined in claim 1, wherein the adhesive resin is selected from the group consisting of ethylene-butyl acrylate copolymer and a polymer of ethylene-butyl copolymer and low-density polyethylene.

4. The method as defined in claim 1, wherein the polymerizable monomer is present in a total amount of 0.2 to 5.0 parts by weight with respect to 100 parts by weight of the adhesive resin.

* * * * *